Feb. 14, 1933.   P. R. ANDREWS   1,897,291
FISHING LINE WEIGHT
Filed Oct. 8, 1929
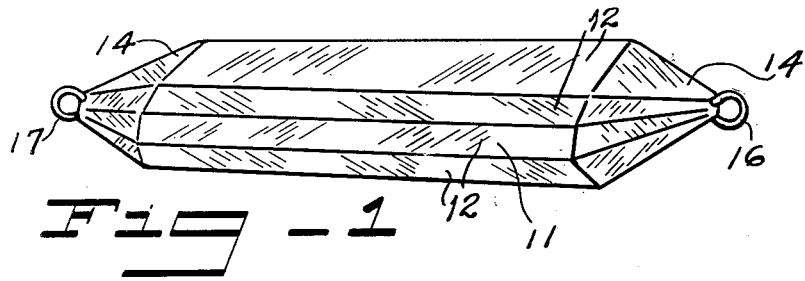
Fig-1
Fig-3    Fig-2

Fig-4
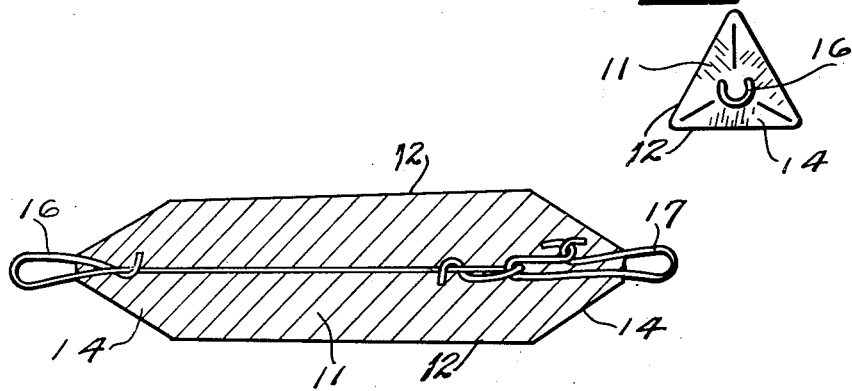
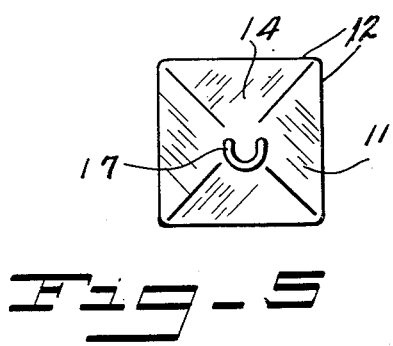
Fig-5
INVENTOR
Phillip R. Andrews
BY
Clarence M. Tuck
ATTORNEY Patented Feb. 14, 1933

1,897,291

UNITED STATES PATENT OFFICE

PHILLIP R. ANDREWS, OF SEATTLE, WASHINGTON, ASSIGNOR TO PACIFIC MARINE SUPPLY COMPANY, OF SEATTLE, WASHINGTON, A CORPORATION OF WASHINGTON

FISHING LINE WEIGHT

Application filed October 8, 1929. Serial No. 398,129.

My invention relates to the fishing industry and more particularly to the heavy metal weights, often referred to as "sinkers" which are employed to weight the fishing lines so that they will properly submerge.

Trolling for fish, by which is meant the towing of a lure behind a boat, has undergone quite a change in recent years. Formerly, trolling was done in an open boat propelled by oars. This, however, limited the radius of action and required that the troller stay in sheltered water necessarily close to land. In recent years, however, trolling has been done with power-propelled boats. In fact the more recently built trolling boats are very able seagoing crafts of considerable size. When a large, expensive boat is employed in the trolling industry, it has been found necessary to employ a plurality of lines in order that the amount of catch may be increased to a point where dividends may be paid on the investment.

Because of this general change in the methods of trolling, it has been found necessary to use heavy metal, usually lead, weights to cause the heavy lines and lures to sink to the depths desired, even where the speed of the boat has been considerably increased. It is quite common for a boat of this type to employ four to six or even more lines at one time. One of the difficulties encountered, however, in using so many lines, has been the danger of entangling the lines when two or more are reeled in at the same time. A common cause of ensnarling is the fact that the lead weights which often weigh many pounds, in some districts weights up to thirty pounds are used on a single line, will, due to the rolling of the boat, often roll about the deck. It is to correct this fault of the weights rolling about and entangling the lines that I have provided my improved fishing weight.

Attempts have been made in the past to prevent the rolling of lead weights by flattening the round weights used. However, when a round weight is flattened thin enough to prevent rolling, it is usually found that its apparent bulk has been so increased as to make it undesirable. Therefore:

The principal object of my invention is to provide a fishing line weight which is so constructed that its tendency to roll is reduced to a minimum.

A further object is to provide lead weights having flat sides which tend to prevent rolling.

A further object is to provide a fish line weight having flat sides and sharp corners which will make them easier to pick up, particularly when they may be covered with fish slime, or when the fisherman is wearing gloves which may be wet.

Another object of my invention is to provide a secure method of imbedding the wire loops which protrude from each end of the weight in a secure and simple manner.

A further object is to provide a fish line weight that does not tend to roll, yet having a sectional density that will permit the construction of heavy weights that are not too bulky.

A further general object is to provide a fishing line weight that is characterized by its neat apearance and simplicity of construction.

I obtained the above objects and others inherent in the same by the devices illustrated in the accompanying drawing, the same being a preferred form of embodiment of my invention, wherein—

Figure 1 is a perspective view showing one of the preferred forms of my invention.

Figure 2 is an end view of the style shown in Figure 1.

Figure 3 shows a modified form of my device.

Figure 4 is an end view of the device shown in Figure 3.

Figure 5 is an end view of a modified form.

Referring to the drawing, throughout which like reference numerals indicate like parts, 11 designates the main body portion of my weights.

Figure 6:
Figure 6 is a cross-sectional view through one of my devices showing a method of securing the end loops.

This body portion is preferably formed of a plurality of flat sides 12. The flat side may be parallelogram or as I have often found it desirable may be in the form of a trapezoid, having parallel ends and equal converging sides. When a solid is produced from such trapezoidal faces, all of whose sides converge to one end of the weight, the resultant solid is larger at one end than the other. Taking the form of a frustum of a right pyramid. This large end should then be made the front end of the weight so as to provide a stream line effect which will reduce the pull on the line. This shape also has the advantage of rolling in a circle in case it is violently thrown about. At each end of body 11, I provide a pyramidal end section 14, which comes nearly to a point where the loops 16 and 17 are attached.

The form shown in Figures 3 and 4 is probably the least apt to roll of any of the forms shown, as naturally the center of gravity with respect to the base is lower than in any other form. I have found, however, that the form shown in Figure 1 is very satisfactory and with this form it is possible to embody a greater amount of weight in the same over all dimensions than in any of the others.

To overcome the difficulty encountered by end loops 16 and 17 pulling out of the lead into which they are cast, I provide loops as indicated in Figure 6 wherein loop 17 is bent back upon itself and the two ends twisted together, and is so placed in the mould that the twist is moulded into the weight.

Loop 16, I prefer to run clear through the weight until it may be passed through loop 17 and then bent back upon itself. The other end of loop 16 I prefer to merely bend up as indicated, as I have found that the stiffness of the wire and the fact that it is cast into the weight, will prevent its slipping, provided it is anchored in a manner similar to that shown.

I do not wish the fish line weights herein described to be confused with the lead sinkers such as are normally used by sportsmen. This type of weight usually weighs anywhere from a fraction of an ounce to a matter of a few ounces. My weights, on the other hand are of the type used by the commercial fisherman and usually are not made in weights of less than one to two pounds and often, where conditions demand, may weigh as much as thirty pounds or more.

In my drawing, I have indicated the shapes that I have found to be very satisfactory. I believe it will be apparent that changes might be made in the proportion and arrangement of sides in my device without departing from the spirit of the invention disclosed.

Having thus described my invention in detail, what I claim is:

1. A fishing line weight consisting of an elongated metal body having an intermediate portion formed as a frustum of a right pyramid; end portion of pyramid form at each end of the weight and a line engaging loop at the extreme end of the weight.

2. A fishing line weight consisting of an enlongated metal body having an intermediate portion formed as a frustum of a right pyramid; end portions of pyramidal form at each end of the weight, the flat faces of the end portions having bases coinciding with the ends of the flat surfaces of the intermediate portion, and a line engaging loop at the large end of the weight.

In witness whereof, I hereunto subscribe my name this 10th day of September A. D. 1929.

PHILLIP R. ANDREWS.